United States Patent
Dixon

(10) Patent No.: US 9,282,108 B2
(45) Date of Patent: *Mar. 8, 2016

(54) GENERALIZED CERTIFICATE USE IN POLICY-BASED SECURE MESSAGING ENVIRONMENTS

(71) Applicant: International Business Machines Corporation, Armonk, NY (US)

(72) Inventor: Bret W. Dixon, South Perth (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/222,203

(22) Filed: Mar. 21, 2014

(65) Prior Publication Data

US 2014/0281558 A1    Sep. 18, 2014

Related U.S. Application Data

(63) Continuation of application No. 13/799,732, filed on Mar. 13, 2013.

(51) Int. Cl.
*H04L 9/32* (2006.01)
*H04L 29/06* (2006.01)

(52) U.S. Cl.
CPC ............ *H04L 63/126* (2013.01); *H04L 63/104* (2013.01); *H04L 63/20* (2013.01)

(58) Field of Classification Search
CPC ..... H04L 63/0823; H04L 63/12; G06F 21/33; H04W 12/06
See application file for complete search history.

(56) References Cited

U.S. PATENT DOCUMENTS

| | | | | |
|---|---|---|---|---|
| 8,074,066 | B2 * | 12/2011 | Brown et al. | 713/156 |
| 2003/0204722 | A1 * | 10/2003 | Schoen et al. | 713/156 |
| 2004/0010698 | A1 * | 1/2004 | Rolfe | 713/186 |
| 2005/0246766 | A1 * | 11/2005 | Kirkup | H04L 63/0823 |
| | | | | 726/6 |

(Continued)

FOREIGN PATENT DOCUMENTS

WO    2005107133 A1    11/2005

OTHER PUBLICATIONS

Author Unknown, Google Message Encryption, Article, 2008, pp. 1-3, Google Inc., Published online at: http://www.google.co.in/url?sa=t&rct=j&q=&esrc=s&source=web&cd=2&ved=0CDMQFjAB&url=http%3A%2F%2Fwww.google.com%2Fa%2Fhelp%2Fintl%2Fen%2Fsecurity%2Fpdf%2Fmessage_encryption.pdf&ei=-uhdUKDbN8vtrQfsyYG4DQ&usg=AFQjCNEP3dklZtH-0ZdzNzmincLXDDmFgw.

(Continued)

*Primary Examiner* — Shewaye Gelagay
*Assistant Examiner* — Khoi Le
(74) *Attorney, Agent, or Firm* — Lee Law, PLLC; Christopher B. Lee

(57) ABSTRACT

Within a secure messaging environment, a determination is made that a request to send a message has been generated by a user. A message protection policy configured to process the message within the secure messaging environment is identified. The message protection policy specifies that, within the secure messaging environment, a secured digital certificate, other than a user-assigned digital certificate of the user, is configured with an associated private key to digitally sign the message on behalf of the user. Based upon the message protection policy, a determination is made to digitally sign the message using the private key of the secured digital certificate. The message is signed on behalf of the user using the private key of the secured digital certificate.

6 Claims, 6 Drawing Sheets

(56) References Cited

U.S. PATENT DOCUMENTS

| | | | | |
|---|---|---|---|---|
| 2005/0257045 | A1* | 11/2005 | Bushman | G06Q 20/02 713/156 |
| 2006/0048210 | A1* | 3/2006 | Hildre | H04L 29/06 726/1 |
| 2008/0270789 | A1* | 10/2008 | Bandini et al. | 713/156 |
| 2009/0257593 | A1* | 10/2009 | Losovsky | 380/259 |
| 2011/0208961 | A1 | 8/2011 | Bushman et al. | |
| 2013/0318353 | A1* | 11/2013 | Skarda | 713/175 |

OTHER PUBLICATIONS

Jaromir Likavec, et al., Enforcing Messaging Security Policies, Proceedings of the Third IEEE International Workshop on Information Assurance (IWIA), 2005, pp. 131-138 (Abstract only available), IEEE Computer Society, Washington, DC.

United States Patent and Trademark Office, Office Action for U.S. Appl. No. 13/799,732, Jul. 31, 2014, pp. 1-29, Alexandria, VA, USA.

United States Patent and Trademark Office, Office Action for U.S. Appl. No. 13/799,732, Jan. 29, 2015, pp. 1-33, Alexandria, VA, USA.

United States Patent and Trademark Office, Advisory Action for U.S. Appl. No. 13/799,732, May 4, 2015, pp. 1-13, Alexandria, VA, USA.

United States Patent and Trademark Office, Notice of Allowance for U.S. Appl. No. 13/799,732, Nov. 10, 2015, pp. 1-16, Alexandria, VA, USA.

* cited by examiner

GENERALIZED CERTIFICATE USE IN POLICY-BASED SECURE MESSAGING ENVIRONMENTS

RELATED APPLICATIONS

This application is a continuation of and claims priority to and claims the benefit of U.S. patent application Ser. No. 13/799,732 titled "GENERALIZED CERTIFICATE USE IN POLICY-BASED SECURE MESSAGING ENVIRONMENTS," which was filed in the United States Patent and Trademark Office on Mar. 13, 2013, and which is incorporated herein by reference in its entirety.

BACKGROUND

The present invention relates to certificate use within messaging environments. More particularly, the present invention relates to generalized certificate use in policy-based secure messaging environments.

Digital certificates, such as those, for example, based upon the X.509 standard used in a public key infrastructure (PKI), may be used to both sign and encrypt data using, for example, a public-key cryptographic standard (PKCS), such as PKCS#7. Data that has been digitally signed in this case uses the private key of the originator (or sender) of the data and the data is verified by the recipient using the public key of the sender's certificate. Data that is encrypted utilizes the public key of the intended recipient to encrypt the data for that particular recipient, and the recipient uses the private key of the recipient to decrypt the data.

BRIEF SUMMARY

A method includes determining, within a secure messaging environment, that a request to send a message has been generated by a user; identifying a message protection policy configured to process the message within the secure messaging environment, where the message protection policy specifies that, within the secure messaging environment, a secured digital certificate, other than a user-assigned digital certificate of the user, is configured with an associated private key to digitally sign the message on behalf of the user; determining, based upon the message protection policy, to digitally sign the message using the private key of the secured digital certificate; and signing the message on behalf of the user using the private key of the secured digital certificate.

A system includes a memory and a processor programmed to: determine, within a secure messaging environment, that a request to send a message has been generated by a user; identify, within the memory, a message protection policy configured to process the message within the secure messaging environment, where the message protection policy specifies that, within the secure messaging environment, a secured digital certificate, other than a user-assigned digital certificate of the user, is configured with an associated private key to digitally sign the message on behalf of the user; determine, based upon the message protection policy, to digitally sign the message using the private key of the secured digital certificate; and sign the message on behalf of the user using the private key of the secured digital certificate.

A computer program product includes a computer readable storage medium having computer readable program code embodied therewith, where the computer readable program code when executed on a computer causes the computer to determine, within a secure messaging environment, that a request to send a message has been generated by a user; identify a message protection policy configured to process the message within the secure messaging environment, where the message protection policy specifies that, within the secure messaging environment, a secured digital certificate, other than a user-assigned digital certificate of the user, is configured with an associated private key to digitally sign the message on behalf of the user; determine, based upon the message protection policy, to digitally sign the message using the private key of the secured digital certificate; and sign the message on behalf of the user using the private key of the secured digital certificate.

DETAILED DESCRIPTION

Figure 1:
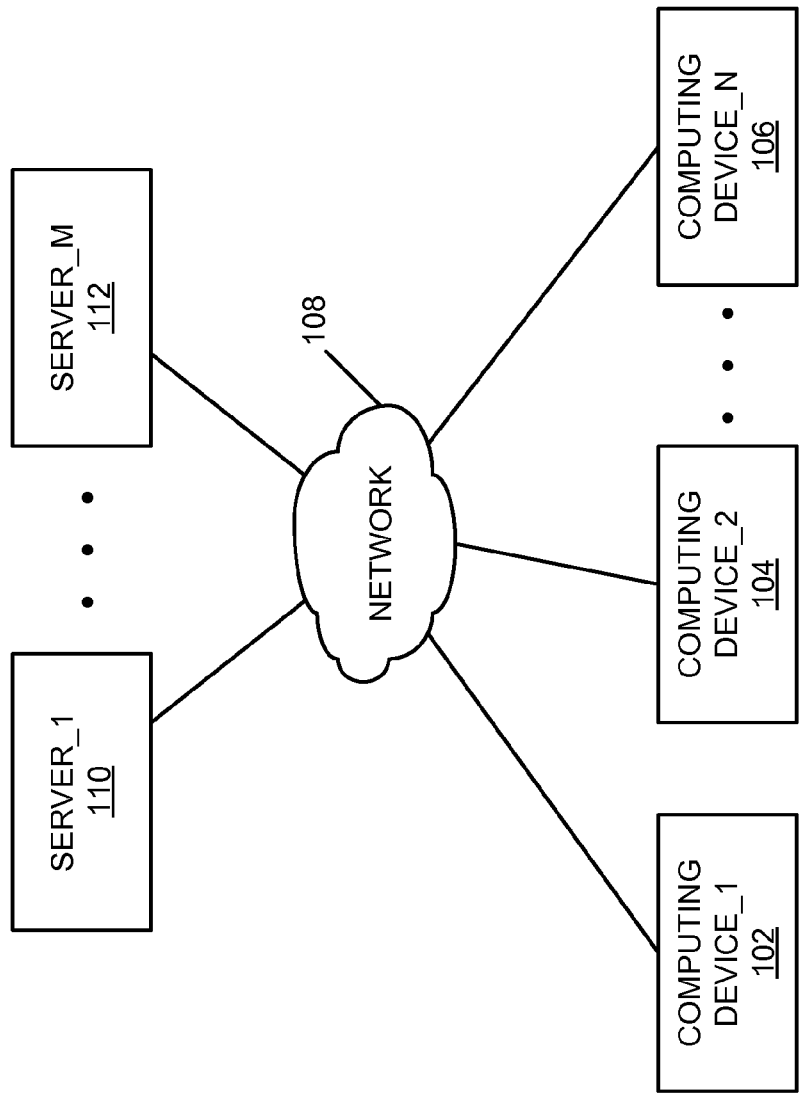
FIG. 1 is a block diagram of an example of an implementation of a system for automated generalized certificate use in policy-based secure messaging environments according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides generalized certificate use in policy-based secure messaging environments. Within a secure messaging environment, a secure messaging component, as described below, operates as a message data protection and security device on behalf of users. In response to a request to send a message that has been generated by a user, the secure messaging component may identify a message protection policy. The message protection policy is configured to process the message within the secure messaging environment and specifies a secured digital certificate (e.g., a digital certificate other than a user-assigned digital certificate of the user) that is configured with an associated private key to digitally sign the message on behalf of the user and within the secure messaging environment. Based upon the message protection policy, the message is signed by the secure messaging component on behalf of the user using the private key associated with the secured digital certificate. Multiple users may be authorized to have messages signed within the secure messaging environment by the secure messaging component, and multiple recipients may be specified. In any such cases, a single digital certificate may be used to provide message data protection for one or more users, which may improve operational efficiency. Additionally, the users do not have access to the secured digital certificates, which may improve secure messaging environment security.

As such, the present subject matter operates as a message security proxy mechanism within a secure messaging environment. A single certificate (or several certificates) may be shared for message protection purposes among multiple messaging participants without exposing the private key to the participants. The present technology may be implemented at any level within the secure messaging environment, such as for example within a queue manager, a data protection module within the secure messaging environment that interfaces with a queue manager, or other component, as appropriate for a given implementation. The examples herein generally utilize queue managers for ease of description purposes, though it is understood that the examples apply to any device that may be utilized to implement the present technology. The device that implements the present technology within a secure messaging environment may be referred to generally below as the "secure messaging component" for ease of reference to the set of devices that may be used to implement the present technology.

Messages may be received or intercepted by the secure messaging component and security may be applied to the messages, as configured, based upon a message protection policy (alternatively, "protection policy" herein). The protection policy identifies one or more digital certificates to use for a particular messaging interaction. These digital certificates may be certificates assigned to the respective secure messaging component or may be certificates that are managed by the respective secure messaging component. The assigned or managed certificate credentials may, as such, be used in place of the sending or receiving user's credentials, when the secure messaging environment is directed to do so by the message protection policy. As such, the present technology reduces (e.g., minimizes) the number of individual digital certificates provisioned within a secure messaging environment and reduces (e.g., minimizes) the encryption/decryption overhead when multiple potential message recipients are involved.

When a message is placed on or destined for a queue, the respective protection policy may be identified and evaluated to determine whether the protection policy indicates that the secure messaging component's assigned or managed private key should be used to digitally sign the message, or whether a user's private key should be used to digitally sign the message. Additionally, if stipulated by the protection policy, one or more recipient public keys may be used to encrypt the message data. These public keys may be the receiving secure messaging component's assigned or managed public keys, or may be public keys of individual message recipients, as appropriate for a given implementation.

When a message is retrieved from a queue or during delivery within the secure messaging environment, the respective protection policy (may be the same or a different policy depending upon the particular implementation) may be identified and evaluated to determine whether the protection policy indicates that the secure messaging component's assigned or managed private key should be used for decryption of the message, or whether a user's private key should be used for decryption of the message. Additionally, if stipulated by the message protection policy, the sender's public key may be used to verify the digital signature of the message. This public key may be the sending secure messaging component's assigned or a managed public key, or may be the public key of individual message sender, as appropriate for a given implementation.

As such, multiple message participants are not required to have an assigned digital certificate or a private key at all, as each user may use the secure messaging component's assigned or managed certificate and private key, if authorized. Authorization to utilize the respective secure messaging component's assigned or managed certificates may be configured for individual users, groups, or otherwise as appropriate for a given implementation. Accordingly, the overhead of encrypting messages for multiple potential recipients may be reduced by allowing the encryption of a message for a subset of recipients or as few as a single recipient, and the messages may be decrypted for the entire set of the multiple recipients.

Authorizations/permissions may be configured, such that users may be specified that are authorized to use the secure messaging component's assigned or managed private keys. The respective message protection policy may be extended to identify those message participant users that are authorized to use the secure messaging component's assigned or managed private keys. Alternatively, the authorizations for specific users to use the secure messaging component's assigned or managed private keys may reside in permissions or configurations external to the message protection policy (e.g., by use of external security manager (ESM) resource permissions, or otherwise as appropriate for a given implementation). The policy extensions to support the present technology may be implemented using any syntax that identifies authorized users to use the secure messaging component's assigned or managed private keys. Verification of the authorizations/permissions to use the respective secure messaging component's assigned or managed private keys for signing and decryption may be implemented for individual users or groups of users, as appropriate for a given implementation, and may be considered optional as appropriate for a given implementation. However, it is understood that, in practice, the security benefits of verification of the authorizations/permissions may outweigh the moderate message processing overhead.

The following example message policy pseudo syntax represents one possible implementation of syntax for implementation of a message protection policy to utilize a certificate assigned to or managed within the secure messaging environment itself.

create secpolicy
  -p PolicyName
  -s SigAlg
  -e EncAlg
  -r DN of Recipient
  -u DN for get/put user1 (optional DN for get/put user2) (other than user's own DN(s))

Within the example message policy pseudo syntax above, the first line specifies a policy name. The second line and third line specify an algorithm to use for digital signatures and encryption, respectively. The fourth line specifies a distinguished name (DN) of the recipient.

The last line specifies a new policy option, the "-u" policy option. The "-u" policy option indicates that a particular DN is to be used for messaging under this message protection policy. One or more distinguished names (DNs) are specified with the "-u" policy option. As such, multiple users may be identified using individual DNs or groups may be specified using group DNs. The DN(s) specify, as noted by comment within the above example message policy pseudo syntax, that DNs other than the user's/group's DN is/are to be used for message protection.

It should be noted that this example message policy pseudo syntax may be applied to both sending and receiving environment policies. The example message policy pseudo syntax indicates use of the public/private key pair associated with the named DN (-u DN) as if it were the user's public/private key pair. The secure messaging environment may use the DN to find the certificate (public key) and associated private key, and use these keys for the relevant message protection. This last DN (-u DN) represents the DN of the secure messaging component's assigned or managed private key to be used for the respective messaging interactions. It should be noted that other syntactic alternatives exist for expression of policy options, and all such alternatives are considered to be within the scope of the present subject matter.

As described above, the present technology provides an additional security check (verification) to confirm that the getting/putting user has authority to exploit the "-u" option (e.g., only authorized users will be permitted to get/put from a queue that has a policy that uses the "-u" option, or at a more granular level, be permitted to use a DN specified by the "-u" option).

Regarding the "managed" private keys, where a number of digital certificates are managed by the secure messaging component, a distinguished name, which represents a set of attribute values that uniquely identifies an entity, may be associated with user identifiers within the message protection policies. As such, a distinguished name (DN) of the secure messaging component's managed private keys may be used to identify the respective user(s) that are authorized to use the respective managed private keys. It is understood that a distinguished name may include, for example, a common name (CN), organization (O), and country (C). As such, a DN may be configured as: CN=UserName, O=CompanyName, C=CountrySymbol.

Group certificates or group keys may be established, such that a "Group A" may be configured in a message protection policy that indicates to "use group A" certificate for a particular set of users (e.g., using the respective distinguished name (DN)). For example, if one thousand (1000) users utilize a particular computer service, a special group certificate may be created and used by the secure messaging environment for all users in the group. As such, signing and verification of digital signatures, and encryption and decryption of message payloads, may be further reduced using group certificates within the certificates managed by the secure messaging environment.

Using the present technology, message protection policies may be configured to allow several options for digital certificate use in association with different users. For example, the secure messaging component (which may be a queue manager) may utilize a queue manager certificate, a certificate managed by a queue manager, a certificate managed by another component within the secure messaging environment, or a certificate of the user. The respective protection policies may be configured to utilize a variety of digital certificates as appropriate and configured for the respective users.

Additionally, the message protection policies may be configured as system-wide message protection policies or may be dynamic message protection policies that apply to individual resources. For example, a message protection policy may typically be applied to every message queue or to a specific message queue, respectively. As such, the protection policies may be expressed with whatever granularity appropriate for a given implementation, by providing the respective DN of the entity.

Additionally, security within a secure messaging environment may be increased by use of the present technology because access to the private keys may be limited to accesses only by/within the secure messaging environment itself. As such, the private key is not exposed to or accessible by the respective messaging participants. This configuration and limited access to private keys may further enhance security within the secure messaging environment.

Based upon the present technology, the number of individual certificates that need to be assigned within a secure messaging environment may be reduced, which further reduces cost and administrative overhead. Additionally, encryption/decryption overhead may be reduced where multiple potential message recipients are involved (e.g., because encryption/decryption may be performed for one recipient rather than potentially thousands). Further, existing secure messaging environments may implement the present technology without being adversely affected by the introduction of the present technology because existing policies may remain intact and unaffected, and application programs do not have to be rebuilt or enhanced.

For purposes of the present description, a secure messaging environment may be considered a messaging environment where the security of message data is considered highly important (e.g., critical). A secure messaging environment may utilize data-protection policies that stipulate how message data is to be protected. As such, the secure messaging environment ensures the application of data-protection policies to protect message data.

It should be noted that conception of the present subject matter resulted from recognition of certain limitations associated with certificate use in secure messaging environments. For example, it was observed that when a message is placed on a queue by an application, a data-protection policy may exist that stipulates the message should be digitally signed by the originator. It was observed that, similarly, when a message is retrieved from a queue by an application, a data-protection policy may exist that stipulates the message is expected to be signed and its signature should be verified. In addition, it was observed that a data-protection policy may stipulate that message data should be encrypted for one or more recipients. As such, when a message is placed on a queue, the secure messaging environment encrypts the message data for each potential recipient. Encryption in this case may involve encryption of the message data using a symmetric key that is also itself encrypted for each potential recipient. It was additionally observed that when the message is retrieved by one of those recipients, the secure messaging environment decrypts the message and delivers it to the recipient. It was further observed that exchanging protected messages between specific identities typically involves the use of digital certificates, where each participant has a public/private key pair. As such, message senders use their private key to digitally sign messages that they send, and use the public key of the recipient(s) to encrypt the message data (symmetric key). Additionally, message receivers use their private key to decrypt messages they receive, and use the public key of the sender to verify the sender's signature.

However, in view of these several observations, it was determined that in secure messaging environments that involve potentially thousands of participants, each participant must have a digital certificate and private key. It was further determined that such provisioning and maintenance may be costly in terms of certificate cost (if purchased from a vendor) and administrative overhead (managing thousands of certificates and key stores). It was further determined that a problem may occur when a message has a large number of potential recipients (e.g., thousands of recipients) in that the resource cost to encrypt a single message for multiple (even hundreds of) recipients may burden resources to the point of impracticality, which would compromise the secure messaging environment. In addition, it was determined that there are higher resource costs and limitations on the number of certificates a key ring or key store can host, and that such costs and limitations may make it impossible to perform secure messaging in certain environments and secure message distribution situations.

The present subject matter improves messaging in secure messaging environments by providing for generalized certificate use in policy-based secure messaging environments, as described above and in more detail below. As such, improved operation and maintenance within policy-based secure messaging environments may be obtained by use of the present technology.

The generalized certificate use in policy-based secure messaging environments described herein may be performed in real time to allow prompt policy-based certificate use in secure messaging environments. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated generalized certificate use in policy-based secure messaging environments. A computing device_1 102, a computing device_2 104, through a computing device_N 106 communicate via a network 108 with a server_1 110 through a server_M 112. It should be noted that the configuration of FIG. 1 is one possible example of an implementation and, as described above, many variations of system implementations are possible. However, for purposes of clarity with respect to the present example, any device within the system 100 may operate locally or remotely with respect to any other device. Further, when running locally, there is no cross-network communications involved between the respective local devices.

As will be described in more detail below in association with FIG. 2 through FIG. 5B, the computing device_1 102 through the computing device_N 106 and the server_1 110 through the server_M 112 may provide automated generalized certificate use in policy-based secure messaging environments, as appropriate for a given implementation. As such, multiple devices may collaboratively provide automated generalized certificate use in policy-based secure messaging environments or a single device may provide automated generalized certificate use in policy-based secure messaging environments. Additionally, the present technology may be implemented at a user computing device or server device level. A variety of possibilities exist for implementation of the present subject matter, and all such possibilities are considered within the scope of the present subject matter.

The automated generalized certificate use in policy-based secure messaging environments is facilitated by a secure messaging component, such as a queue manager, a data protection service/module, or other module that interfaces within a secure messaging environment between a sending device/application and a receiving device/application. A queue manager application may also process queue management functionality at the direction of a data protection service/module. For purposes of brevity within the present description, and given the variety of components that may be configured to implement the present technology, the respective modules may be referred to herein as secure messaging components, where reference to the secure messaging component is understood to reference any particular implementation as appropriate for a given implementation. It is further understood that one or more secure messaging components may be utilized to implement the present subject matter as appropriate for a given implementation.

The automated generalized certificate use in policy-based secure messaging environments facilitates secure proxied message signing within a secure messaging environment on behalf of one or more sending and receiving applications. Regarding message initiation requests, a "put" request for a message initiated by a sending module may be intercepted or received by a secure messaging component and processed according to the appropriate message protection policy. Conversely, with respect to receipt of a message, a "get" request for a message from a receiving module may be intercepted or received by the secure messaging component.

It should be noted that the computing device_1 102 through the computing device_N 106, and/or the server_1 110 through the server_M 112, may be a portable computing device, either by a user's ability to move the respective device to different locations, or by the respective device's association with a portable platform, such as a plane, train, automobile, or other moving vehicle. It should also be noted that the computing device_1 102 through the computing device_N 106 and the server_1 110 through the server_M 112 may be any computing device capable of processing information as described above and in more detail below. For example, any of the respective computing devices may include devices such as a mainframe computer, a distributed computing device within a distributed network of computing devices, a personal computer (e.g., desktop, laptop, etc.) or a handheld device (e.g., cellular telephone, personal digital assistant (PDA), email device, music recording or playback device, etc.), or any other device capable of processing information as described in more detail below.

The network 108 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 110 through the server_M 112 may include any device capable of providing data for consumption by a device, such as the computing device_1 102 through the computing device_N 106, via a network, such as the network 108. For example, the server_1 110 through the server_M 112 may each represent a web server, an application server, or other data server device, as appropriate for a given implementation.

Figure 2:
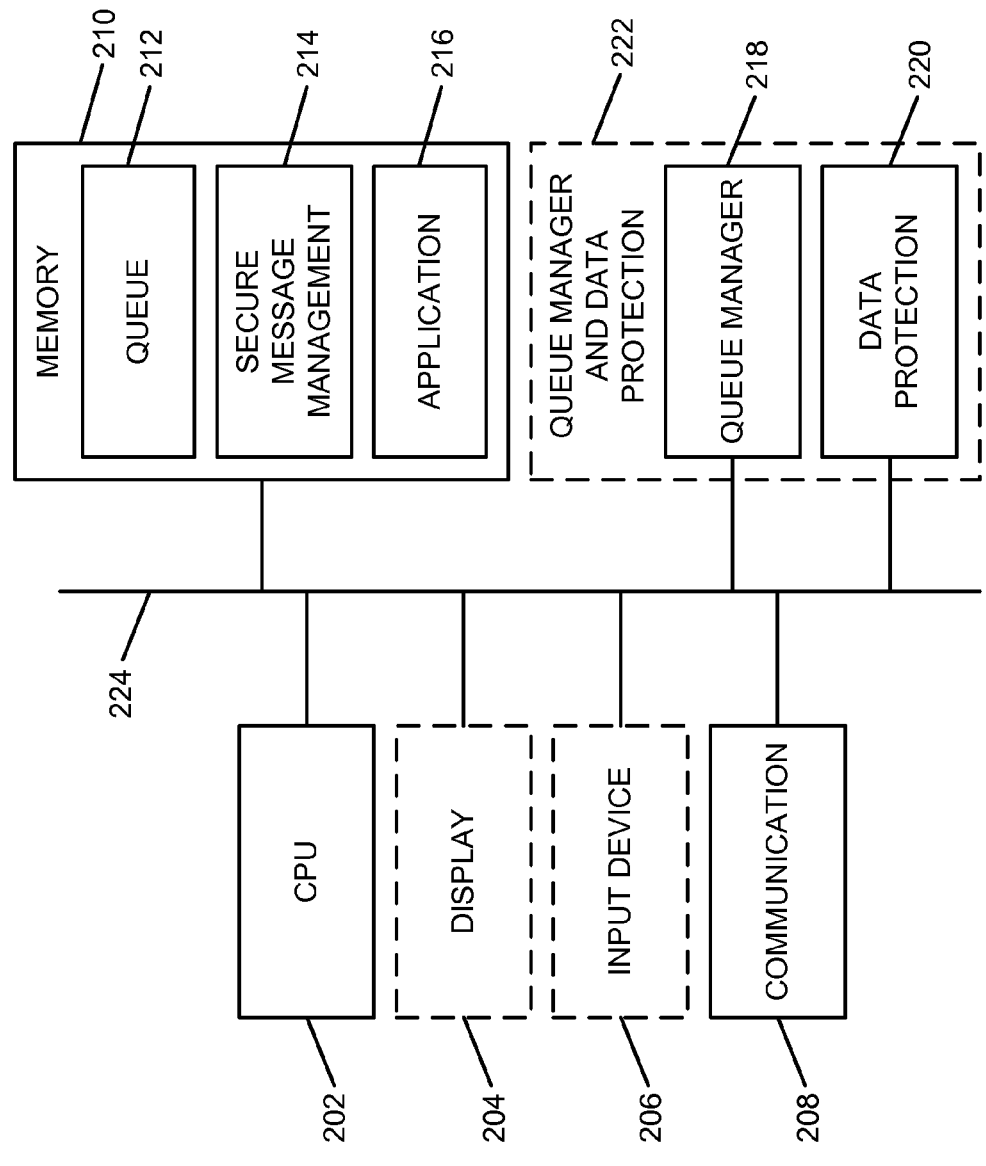
FIG. 2 is a block diagram of an example of an implementation of a core processing module capable of performing automated generalized certificate use in policy-based secure messaging environments according to an embodiment of the present subject matter.

FIG. 2 is a block diagram of an example of an implementation of a core processing module 200 capable of performing automated generalized certificate use in policy-based secure messaging environments. The core processing module 200 may be associated with any of the computing device_1 102 through the computing device_N 106 and/or any of the server_1 110 through the server_M 112, as appropriate for a given implementation. As such, the core processing module 200 is described generally herein, though it is understood that many variations on implementation of the components within the core processing module 200 are possible and all such variations are within the scope of the present subject matter. Further, the core processing module 200 may provide different and complementary processing for generalized certificate use in policy-based secure messaging environments for assigned and/or managed digital certificates in association with each implementation within a secure messaging environment, as described in more detail below. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.). The core processing module 200 is capable of performing automated generalized certificate use in policy-based secure messaging environments.

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a queue storage area 212, a secure message management storage area 214, and an application area 216. The queue storage area 212 stores queues that may include one or more queues for communicating messages between applications and/or devices, as described above and in more detail below. However, it should be noted that the memory 210 represents a general implementation of a storage device and that any suitable device capable of storing the data described herein may be used, such as for example a hard disk or other device, as described in more detail below. The secure message management storage area 214 stores information, such as message protection policies for protection of data within messages and other information as appropriate for a given implementation. The application area 216 represents storage and execution space for one or more applications, such as one or more requester applications and/or one or more responder applications.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A queue manager module 218 provides queue management processing for the core processing module 200, such as placement of messages onto and retrieval of messages from queues stored within the queue storage area 212, as described above and in more detail below. A data protection module 220 is also shown. The data protection module 220 implements the automated generalized certificate use in policy-based secure messaging environments of the core processing module 200. The data protection module 220 intercepts messaging, such as messages sent (e.g., "put") to a queue or requested (e.g., "get") from a queue, from one or more applications that may be executing locally within the application area 216 or remotely at another device.

It is additionally noted that a queue manager and data protection module 222 is illustrated via a dashed-line representation within FIG. 2. The queue manager and data protection module 222 is shown to include both the queue manager module 218 and the data protection module 220, and is illustrated by the dashed-line representation to indicate that the queue manager module 218 and the data protection module 220 may be implemented within a single module as appropriate for the given implementation.

The CPU 202, the display 204, the input device 206, the communication module 208, the memory 210, the queue manager module 218, the data protection module 220, and the queue manager and data protection module 222 are interconnected via an interconnection 224. The interconnection 224 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
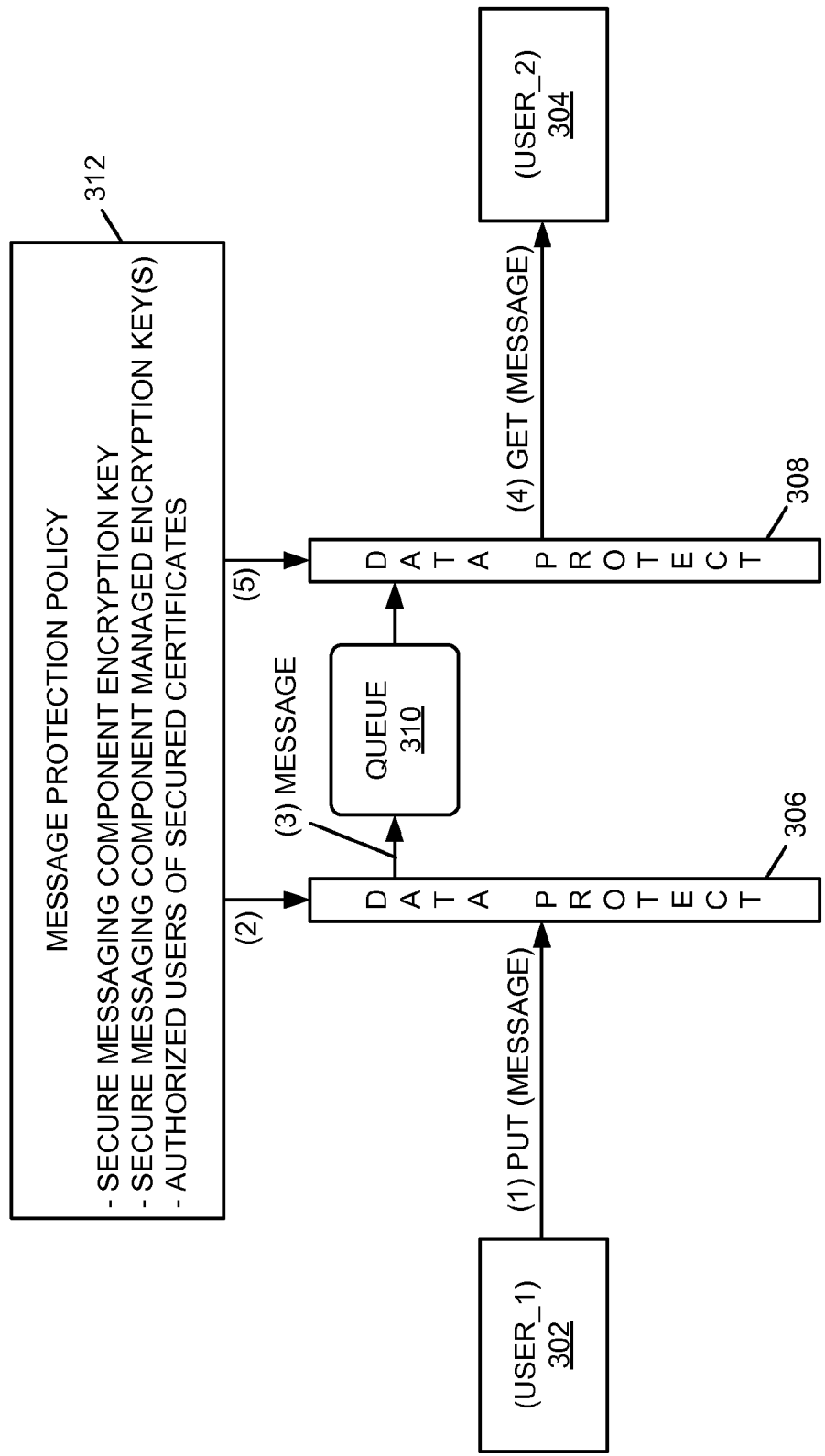
FIG. 3 is a logical block diagram of an example of an implementation of a messaging interaction that illustrates generalized certificate use in policy-based secure messaging environments according to an embodiment of the present subject matter.

FIG. 3 is a logical block diagram of an example of an implementation a messaging interaction 300 that illustrates generalized certificate use in policy-based secure messaging environments. The logical block diagram of FIG. 3 represents a secure messaging environment for purposes of the present description. As a logical block diagram, details of the mapping of the respective components of FIG. 3 onto the example architecture of the core processing module 200 of FIG. 2 may be understood by review of the details of the core processing module 200 described above. These details are omitted from FIG. 3 to eliminate crowding within the drawing content of FIG. 3. Further, separate queue manager modules, such as the queue manager module 218, are omitted also to avoid crowding within the drawing content of FIG. 3. However, it is understood that a queue manager module functions to process message placement to and retrieval from queues, and that queues may be stored, for example, within one or more queue storage areas, such as the queue storage area 212 described above. Additionally, data protection modules, such as the data protection module 220, may be implemented as one or more data protection modules. Message protection policies may be stored, for example, within one or more queue management storage areas, such as the queue management storage area 214. For any implementation including more than one of any such component, the multiple components may be implemented within one or more devices, and as such, within one or more core processing modules 200. In view of the significant number of variations in implementation, details of the mapping of the components of FIG. 3 to any specific architecture are omitted herein for brevity and may vary based upon the description herein as appropriate for any given implementation.

Referring to FIG. 3, a message sender (USER_1) 302 interacts with a message recipient (USER_2) 304 in a messaging operation within a secure messaging environment implementation. A data protection module 306 protects data and messages for the message sender (USER_1) 302 by signing and encrypting messaging sent from the message sender (USER_1) 302. It should be noted that, while the present example does not detail reception of messages by the message sender (USER_1) 302, processing as described below for message recipient (USER_2) 304 may be implemented by the data protection module 306 to decrypt and verify messaging received by the message sender (USER_1) 302.

A data protection module 308 protects data and messages for the message recipient (USER_2) 304 by decrypting and verifying messaging received by the message recipient (USER_2) 304 and signing and encrypting messaging sent from the message recipient (USER_2) 304. It should be noted that, while the present example does not detail sending of messages by the message recipient (USER_2) 304, processing as described above and in more detail below for message sender (USER_1) 302 may be implemented by the data protection module 308 to sign and encrypt messaging sent by the message recipient (USER_2) 304.

The logical flow of the messaging interaction 300 begins with the message sender (USER_1) 302 initiating a "put" for a message it desires to send at logical flow point (1) within FIG. 3 (e.g., "(1) PUT (MESSAGE)"). The message may include a static queue name for a Queue 310, the queue may be selected within the secure messaging environment, or the queue may be selected by the data protection module 306.

A Message Protection Policy 312 may be accessed by the data protection module 306. The Message Protection Policy 312 may be used to identify several aspects of message protection. For purposes of the present example, the Message Protection Policy 312 is shown to include at least one secure messaging component encryption key identifier (SECURE MESSAGING COMPONENT ENCRYPTION KEY). The secure messaging component encryption key identifier(s) represent digital certificates assigned to the respective secure messaging component(s). The Message Protection Policy 312 is also shown to include at least one secure messaging component "managed" encryption key identifier (SECURE MESSAGING COMPONENT MANAGED ENCRYPTION KEY). The secure messaging component "managed" encryption key identifier represents digital certificates other than a certificate assigned to the respective secure messaging component(s) that are managed on behalf of another entity within the secure messaging environment by the respective secure messaging component. The secure messaging component encryption key identifier(s) and the secure messaging component "managed" encryption key identifier(s) may be represented, as described above, as a distinguished name (DN) that references a digital certificate with which the respective keys are associated.

The Message Protection Policy 312 also includes an identification of one or more users (AUTHORIZED USERS OF SECURED CERTIFICATES) that are specified as authorized to utilize the proxy services of the secure messaging component for message protection using a digital certificate assigned to or managed by the respective secure messaging component. As described above, the authorized users may be specified with a "-u" policy option with one or more DNs specified for authorization. Additionally, group DNs may be specified with the "-u" policy option. It should be noted that other syntactic alternatives exist for expression of policy options, and all such alternatives are considered to be within the scope of the present subject matter. For purposes of the present example, it is assumed that both the message sender (USER_1) 302 and the message recipient (USER_2) 304 are authorized to have message security provided for them on proxy by a secure messaging component (e.g., data protection modules, queue managers, etc., as appropriate for a given implementation) within the secure messaging environment.

In response to the "put" request for the message at logical flow point (1) within FIG. 3 (e.g., "(1) PUT (MESSAGE)") by the message sender (USER_1) 302, the data protection module 306 analyzes the message and the Message Protection Policy 312 (e.g., at (2)) to determine whether the message sender (USER_1) 302 is authorized to utilize the proxy message security services of the secure messaging environment (or alternatively/additionally to utilize the secure messaging environment at all). In response to determining that the message sender (USER_1) 302 is authorized to utilize the proxy message security services of the secure messaging environment, a determination is made to assign the message to the Message Queue 310. The data protection module 306 or queue manager (not specifically shown, though understood to be represented by the queue manger module 218 of FIG. 2) for the message queue 310 may operate as a secure messaging component, as described herein, to perform message protection services on proxy and on behalf of the message sender (USER_1) 302. Other modules may also operate as secure messaging components, as appropriate for a given implementation.

The respective secure messaging component may select a digital certificate assigned to the secure messaging component (using, for example, a DN of the secure messaging component) or may select a digital certificate managed by the secure messaging component (using, again for example, a DN of a managed certificate). The secure messaging component may sign the message using the selected digital certificate's private key and may encrypt the message using a public key associated with a selected digital certificate. Given that these operations are performed within the secure messaging environment, the present technology allows use of the same selected digital certificate and key pair for the respective operations, or a different selected digital certificate and key pair for the respective operations, as appropriate for a given implementation.

It should be noted that encryption keys may be issued in pairs (private and public key pairs), and that where a public key is used to encrypt a message, a corresponding private key may be used to decrypt the message. With respect to digital signatures, the selected digital certificate's private key may be used to digitally sign messages and the selected digital certificate's pubic key may be used to verify digital signatures applied to messages.

It should be noted that the data protection module 306 (and 308) sits between the respective sender or receiver applications, respectively, and the queue manager so that the data protection module 306 (and 308) may intercept these requests. This allows the data protection module 306 (and 308) to sign and encrypt, and to decrypt and verify signatures "on the fly" during run time. Alternatively, the queue manager (not specifically shown) may perform these tasks on behalf of the respective applications. As such, and as described above, either component may operate to perform the generalized certificate use in policy-based secure messaging environments described herein.

Additionally, the secure messaging component, whether implemented as a data protection module, a queue manager, or otherwise, may encrypt the message payload for each authorized recipient using the public encryption key of the selected digital certificate. As such, and as described above, the message participants themselves are not required to have encryption keys issued/assigned to them and overhead may be reduced where there are multiple message recipients by encrypting the message once for all recipients as a group. The data protection module 306 submits the message to the queue manager (not shown within FIG. 3) for placement on the Message Queue 310. The queue manager places the modified message on the Message Queue 310 at logical flow point (3) within FIG. 3 (e.g., (3) MESSAGE).

As such, the message is now signed and encrypted using a digital certificate other than a user digital certificate. These certificates are not exposed to the respective messaging participants, and security within the secure messaging environment may be improved.

As described above, it is understood that many forms of encryption are available and that any encryption may be used as appropriate for a given implementation. For example, Public Key Infrastructure (PKI) techniques, which involve digital certificates and public and private certificate keys, may be used. Further, an encryption algorithm may be specified within a message, or the algorithm may form part of the queue policy, to request encryption of the message according to a specified encryption algorithm. Encryption algorithms such as triple data encryption algorithm (Triple DES), variations of the advanced encryption standard (AES) such as AES 128 (one hundred and twenty-eight bit), AES 192 (one hundred and ninety-two bit), AES 256 (two hundred and fifty-six bit), Rivest cipher (RC2), RC4, RC5, RC6, and other forms of encryption may be used without departure from the scope of the present subject matter.

It should be noted that, for purposes of the present example, it is assumed that the single Message Protection Policy 312 is utilized to identify secured digital certificates for both signing and encrypting messages, and for decrypting and signature verification. However, it is understood that this information may be distributed across multiple message protection policies.

In response to the "get" request for the request message at logical flow point (4) within FIG. 3 (e.g., "(4) GET (MESSAGE)") by the message recipient (USER_2) 304, the data protection module 308 analyzes the message and the Message Protection Policy 312 to determine an appropriate digital certificate to utilize for decryption of the message and verification of the attached digital signature. The data protection module 308 identifies the digital certificate specified and used by the secure messaging component that signed and encrypted the message, such as within the message or within the Message Protection Policy 312.

Similar to the sending-side processing, the data protection module 308 identifies a decryption (e.g., private) key for the secure messaging component that securely processed the message on behalf of the message recipient (USER_2) 304 within the Message Protection Policy 312 (e.g., at (5)) and decrypts the request message payload encrypted for this particular authorized recipient using the identified private key of the secure messaging component. As described above, where multiple recipients are specified in the message, only one decryption and signature validation are performed. Additionally, the respective messaging participants do not have access to the digital certificates within the secure messaging environment.

It should be noted that the decryption key may be obtained from the digital certificate assigned to or managed by the respective secure messaging component that processed the message. Alternatively, the encryption information may be stored within the respective message protection policies as appropriate for a given implementation. The data protection module 308 provides the decrypted message to the message recipient (USER_2) 304 for processing.

As such, the data protection module 306, the data protection module 308, and a queue manager 218 may each provide all or part of the functionality for generalized certificate use in policy-based secure messaging environments in response to message requests. As described above, one or more recipients may be specified. Where multiple recipients are specified in the message, only one decryption and signature validation are performed, which may improve operational efficiency within the secure messaging environment, particularly for situations where thousands or more recipients are specified. Additionally, because the respective messaging participants do not have access to the digital certificates, security may be improved within the secure messaging environment.

Figure 4:
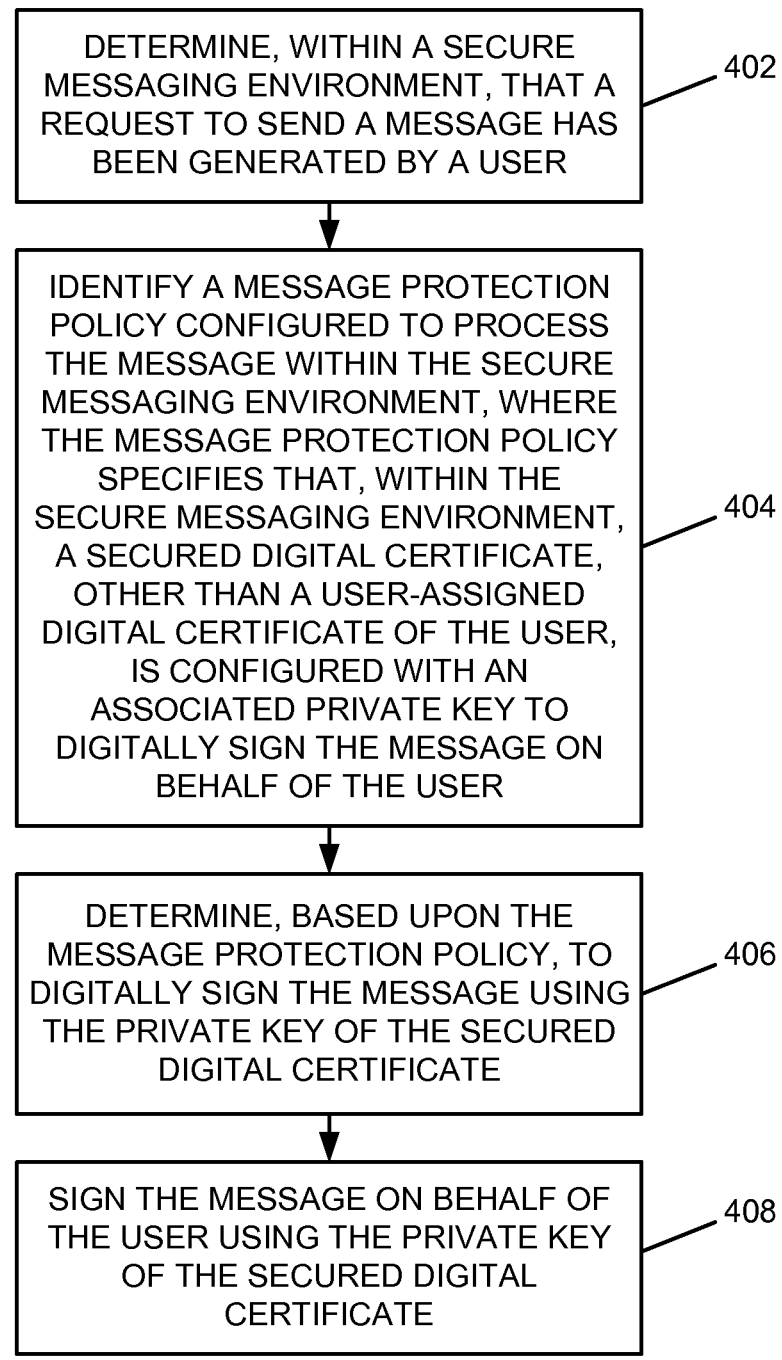
FIG. 4 is a flow chart of an example of an implementation of a process for generalized certificate use in policy-based secure messaging environments according to an embodiment of the present subject matter.
Figure 5A:
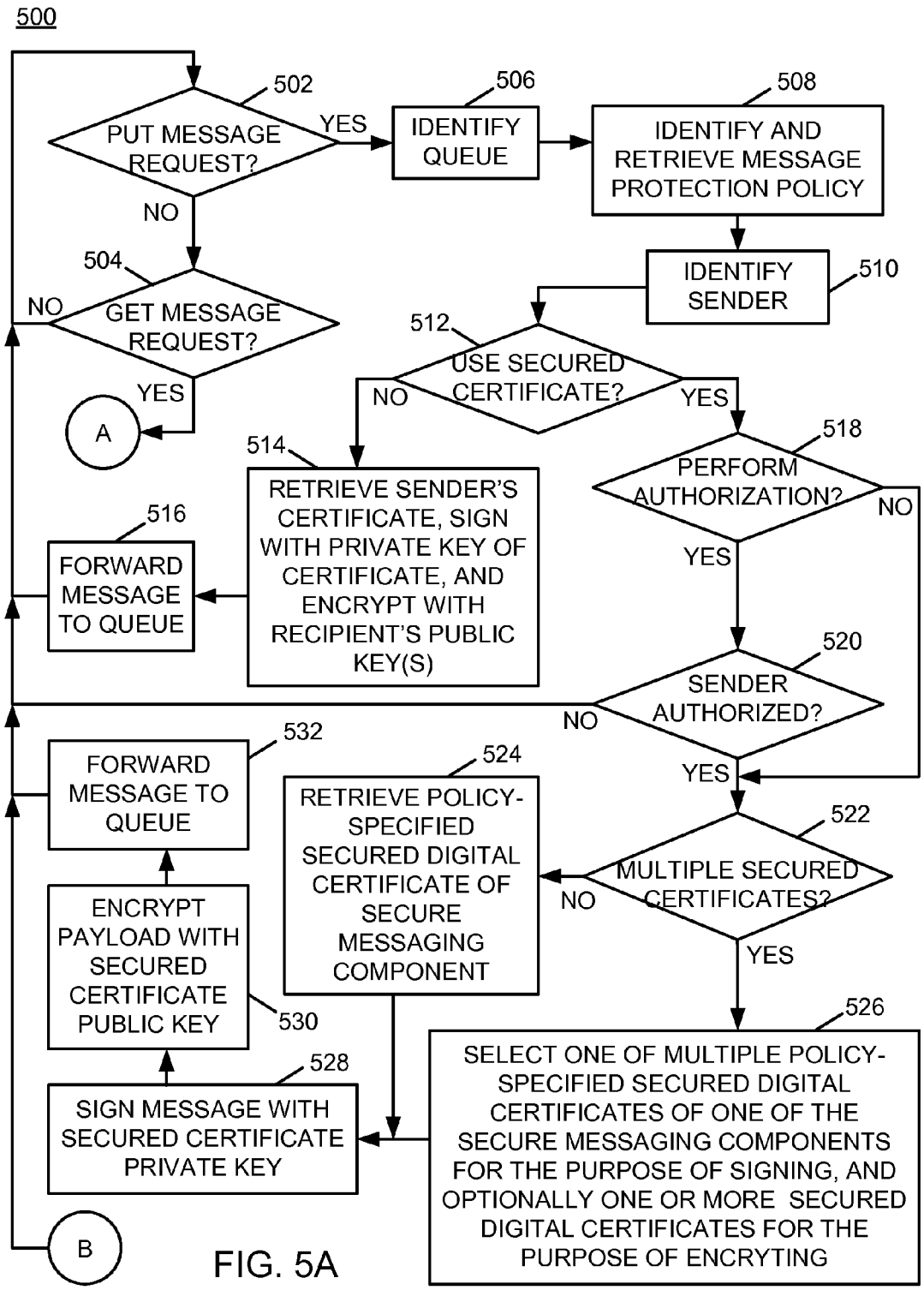
FIG. 5A is a flow chart of an example of an implementation of initial processing with a process for automated generalized certificate use in policy-based secure messaging environments in association with message send and message receive requests according to an embodiment of the present subject matter.
Figure 5B:
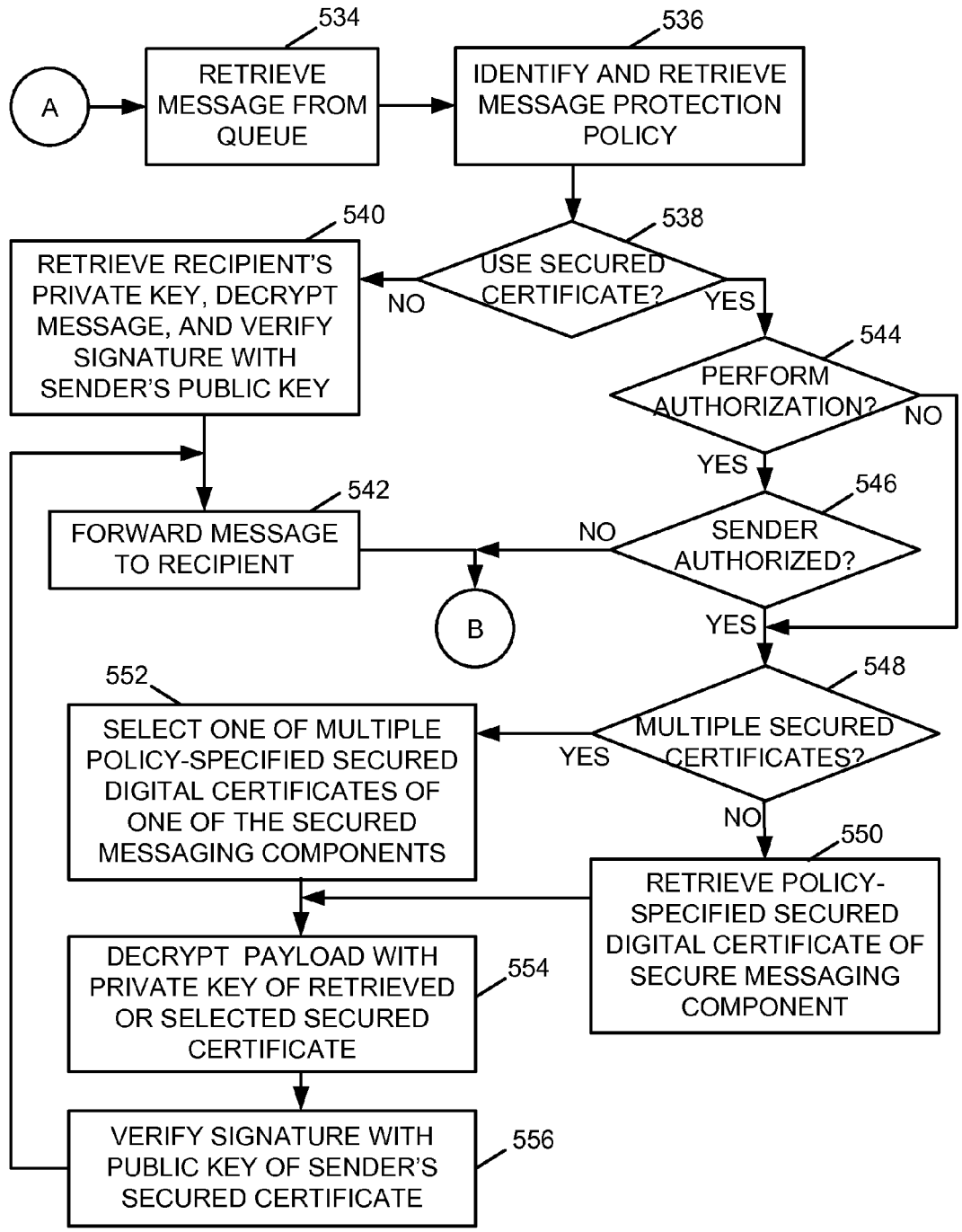
FIG. 5B is a flow chart of an example of an implementation of additional processing within a process for automated generalized certificate use in policy-based secure messaging environments in association with message send and message receive requests according to an embodiment of the present subject matter.

FIG. 4 through FIG. 5B described below represent example processes that may be executed by devices, such as the core processing module 200, to perform the generalized certificate use in policy-based secure messaging environments associated with the present subject matter. Many other variations on the example processes are possible and all are considered within the scope of the present subject matter. The example processes may be performed by modules, such as the queue manager and data protection module 222 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for generalized certificate use in policy-based secure messaging environments. At block 402, the process 400 determines, within a secure messaging environment, that a request to send a message has been generated by a user. At block 404, the process 400 identifies a message protection policy configured to process the message within the secure messaging environment, where the message protection policy specifies that, within the secure messaging environment, a secured digital certificate, other than a user-assigned digital certificate of the user, is configured with an associated private key to digitally sign the message on behalf of the user. At block 406, the process 400 determines, based upon the message protection policy, to digitally sign the message using the private key of the secured digital certificate. At block 408, the process 400 signs the message on behalf of the user using the private key of the secured digital certificate.

FIGS. 5A-5B illustrate a flow chart of an example of an implementation of a process 500 for automated generalized certificate use in policy-based secure messaging environments in association with message send and message receive requests. FIG. 5A illustrates initial processing within the process 500. As described in more detail below, the process 500 protects secured digital certificates against access by a user and provides proxy messaging signing and encryption services within a secure messaging environment for users.

At decision point 502, the process 500 makes a determination as to whether a request to send (e.g., put) a message has been generated by a user and detected by a secure messaging component within a secure messaging environment. As described above, the secure messaging component may include, for example, a queue manager, a data protection module within the secure messaging environment that interfaces with a queue manager, or other component, as appropriate for a given implementation. To continue with the description of higher-level processing, in response to determining that a request to send (e.g., put) a message has not been generated by a user and has not been detected by a secure messaging component within the secure messaging environment, the process 500 makes a determination at decision point 504 as to whether a request to receive (e.g., get) a message has been generated by a user and detected by a secure messaging component within the secure messaging environment. In response to determining that a request to receive (e.g., get) a message has not been generated by a user and has not been detected by a secure messaging component within the secure messaging environment, the process 500 returns to decision point 502 and iterates as described above.

Returning to the description of decision point 502, in response to determining that a request to send (e.g., put) a message has been generated by a user and detected by a secure messaging component within a secure messaging environment, the process 500 identifies a queue specified for the generated message at block 506. The specified queue may be identified, for example, as a default message queue for the particular sender and receiver, may be identified within a message protection policy, may be identified as a parameter to the send request, or may be identified within the message itself (by the user application), as appropriate for a given implementation. For purposes of the present example, it is assumed that the identified queue has been specified other than within the message protection policy, for example, as a parameter to the send request.

As such, at block 508, the process 500 identifies and retrieves a message protection policy. The identified message protection policy may be configured to process the message within the secure messaging environment. Further, the message protection policy may specify that, within the secured messaging environment, a secured digital certificate other than a user-assigned digital certificate of the user is configured with an associated private key to digitally sign the message on behalf of the user. At block 510, the process 500 identifies the sender of the message.

At decision point 512, the process 500 makes a determination as to whether to utilize a secured digital certificate protected within the secure messaging environment to sign or encrypt the message. As described above, the secured digital certificate may include a digital certificate that is either assigned to or managed by a secure messaging component within the secure messaging environment. Though the present example illustrates encryption of the message, it is understood that encryption may be optional for the message, as appropriate for the given implementation.

It should further be noted that the present technology allows independent and granular selection and use of secure certificates for signature and encryption purposes. For example, on the "PUT" side, the present technology allows identification of a secured certificate/private key to sign messages, "or" allows identification of a secured certificate/public key to encrypt messages (i.e. encrypting for the "secured" identity), though it is understood that both operations may be performed using one or more secure certificates as determined based upon the implemented message protection policy. Similarly, on the "GET" side, the present technology allows identification of a secured certificate/private key to use in place of an individual user's key for the purpose of decryption, "or" allows identification of a "secured" certificate/public key to use to verify a sender's signature, though again it is understood that both operations may be performed using one or more secure certificates, again as determined based upon the implemented message protection policy.

As described above, individual sender and receiver certificates may be optionally used, and the present example illustrates this form of processing to differentiate that processing from the generalized certificate use in policy-based secure messaging environments described herein. As such, in response to determining not to utilize a secured digital certificate protected within the secure messaging environment to sign or encrypt the message at decision point 512, the process 500 retrieves the sender's digital certificate, and signs the message with a private key of the sender's digital certificate and encrypts the message (again optionally) for relevant recipients using the public key(s) of the respective recipients at block 514. At block 516, the process 500 forwards the message to the identified message queue, and returns to decision point 502 and iterates as described above.

Returning to the description of decision point 512, it should be noted that authorization of individual message senders or groups of message senders (and individual message receivers or groups of message receivers) may be performed. Though authorization may be configured by default, for example, the present example illustrates authorization processing as a runtime step to further protect the secure messaging environment. Further, indications of senders and recipients that are authorized may be configured within message protection policies (e.g., using DNs of the individual users or groups).

As such, at decision point 512, in response to determining to utilize a secured digital certificate protected within the secure messaging environment to sign or encrypt the message, the process 500 makes a determination at decision point 518 as to whether to perform the authorization processing of the identified sender of the message. In response to determining to perform the authorization processing of the identified sender of the message at decision point 518, the process 500 makes a determination at decision point 520 as to whether the identified sender is authorized to request that the secure messaging environment utilize a secured digital certificate protected within the secure messaging environment to sign or encrypt the message. In response to determining at decision point 520 that the identified sender is not authorized to request that the secure messaging environment utilize a secured digital certificate protected within the secure messaging environment to sign or encrypt the message, the process 500 returns to decision point 502 and iterates as described above. As such, unauthorized users may be prevented from sending messages within the secure messaging environment without an explicit verification of authorization to send messages using protected digital certificates. It should be noted that an error or log of the unauthorized access attempt is considered to be part of the process 500, though it is not explicitly shown to reduce crowding within the drawing figure.

In response to determining that the identified sender is authorized to request that the secure messaging environment utilize a secured digital certificate protected within the secure messaging environment to sign or encrypt the message at decision point 520, or in response to determining not to perform the authorization processing of the identified sender of the message at decision point 518 (e.g., a default authorization has been configured, etc.), the process 500 makes a determination at decision point 522 as to whether multiple (e.g., a group of) secured digital certificates are configured to digitally sign (or optionally encrypt) the message on behalf of the sending user within the secure messaging environment. It is understood that the secured digital certificates described herein are digital certificates assigned to and managed within the secure messaging environment, and are digital certificates other than a user-assigned digital certificate of the sending user (e.g., other than message sender and/or message receiver certificates).

As described above, the determination as to whether multiple secured digital certificates are configured to digitally sign (or optionally encrypt) the message on behalf of the sending user within the secure messaging environment may be made utilizing the identified message protection policy. For example, the secure messaging component may have a digital certificate assigned to it. The secure messaging component may also manage other digital certificates within the secure messaging environment. As such, multiple digital certificates may be configured for use by the secure messaging component for signing and optionally encrypting messages within the secure messaging environment.

In response to determining at decision point 522 that multiple secured digital certificates are not configured to digitally sign and optionally encrypt the message on behalf of the sending user within the secure messaging environment, and that a single digital certificate is indicated to be used within the message protection policy for digitally signing and optionally encrypting the message, the process 500 retrieves the policy-specified secured digital certificate of the secure messaging component at block 524. Alternatively, in response to determining at decision point 522 that multiple secured digital certificates are configured to digitally sign and optionally encrypt the message on behalf of the user within the secure messaging environment, the process 500 selects one of the multiple policy-specified secured digital certificates of one of the secure messaging components (e.g., an assigned or managed digital certificate) for the purpose of signing, and optionally one or more secured digital certificates for the purpose of encrypting, at block 526.

In response to either retrieving the policy-specified secured digital certificate of the secure messaging component at block 524, or in response to selecting one of the multiple policy-specified secured digital certificates of one of the secure messaging components at block 526, the process 500 digitally signs, at block 528, the message within the secure messaging environment with the private key of the retrieved policy-specified secured digital certificate of the secure messaging component or the selected one of the multiple policy-specified secured digital certificates of one of the secure messaging components. It should be noted that, as described above, the message protection policy may further specify that the secured digital certificate is configured to digitally sign messages on behalf of a group of users. As such, groups of users may be authorized to request that the secure messaging component sign or encrypt messages using secured digital certificates within the secure messaging environment. Accordingly, the processing at block 528 may be utilized to sign messages that originate from any members of the associated group of users using the private key of the secured digital certificate.

At block 530, the process 500 encrypts the payload of the digitally-signed message (again, may be optional for a given implementation or message) with the public key of the retrieved secured digital certificate or certificates. It should additionally be noted that, as also described above, the processing at block 530 may include determining whether the message protection policy specifies a single recipient or a group of recipients. As such, the processing at block 530 may include encrypting the message for a single recipient using the public key of the secured digital certificate in response to determining that the message protection policy specifies the single recipient. Alternatively, the processing at block 530 may include encrypting the message for the group of recipients using the public keys of the multiple policy-specified secured digital certificates in response to determining that the message protection policy specifies the group of recipients.

As an additional alternative, because the encryption and decryption are performed within the secure messaging environment, a single encryption may be performed with the public key assigned to the secure messaging component, and decryption may be performed for multiple users of the group in response to "get" requests if the requesting user is a member of the group and authorized within the secure messaging environment to issue such requests. As such, digital certificate count may be reduced for groups by multiplexing certificate use across groups of authorized users.

In response to encrypting the message as described above at block 530, the process 500 forwards the message to the identified message queue at block 532. The process returns to decision point 502 and iterates as described above.

Returning to the description of decision point 504, in response to determining that a request to receive (e.g., get) a message has been generated by a user and detected by a secure messaging component within the secure messaging environment, the process 500 transitions to the processing shown and described in association with FIG. 5B. It is understood that the get request may specify a message queue, and may specify the message queue identified above to which the signed and encrypted message was put.

FIG. 5B illustrates additional processing associated with the process 500 for generalized certificate use in policy-based secure messaging environments in association with message send and message receive requests. At block 534, the process 500 retrieves the signed and encrypted message from the message queue. At block 536, the process 500 identifies and retrieves a message protection policy associated with the message queue.

At decision point 538, the process 500 makes a determination as to whether to utilize a secured digital certificate protected within the secure messaging environment to decrypt or validate the digital signature applied to the message. As described above, the secured digital certificate may include a digital certificate that is either assigned to or managed by a secure messaging component within the secure messaging environment. Though the present example illustrates decryption of the message, it is understood that decryption may be optional for the message, as appropriate for the given implementation, and may be based upon whether it was optionally encrypted on the sending side of the messaging interaction, as is the case with the present example.

As also described above, individual sender and receiver certificates may be optionally used, and the present example illustrates this form of processing to differentiate that processing from the generalized certificate use in policy-based secure messaging environments described herein. As such, in response to determining not to utilize a secured digital certificate protected within the secure messaging environment to decrypt and validate the digital signature applied to the message at decision point 538, the process 500 retrieves the recipient's private key, and decrypts (again optional) the message and validates the digital signature applied to the message with the public key of the sender's digital certificate at block 540. At block 542, the process 500 forwards the message to the recipient, and returns to decision point 502 within FIG. 5A and iterates as described above.

Returning to the description of decision point 538, it should be noted that authorization of individual message senders or groups of message senders (and individual message receivers or groups of message receivers) may be performed. Though authorization may be configured by default, for example, the present example illustrates authorization processing as a run-time step to further protect the secure messaging environment. Further, indications of senders and recipients that are authorized may be configured within message protection policies (e.g., using DNs of the individual users or groups).

As such, at decision point 538, in response to determining to utilize a secured digital certificate protected within the secure messaging environment to decrypt or validate the digital signature applied to the message, the process 500 makes a determination at decision point 544 as to whether to perform the authorization processing of the recipient of the message that issued the "get" request. In response to determining to perform the authorization processing of the recipient of the message that issued the "get" request at decision point 544, the process 500 makes a determination at decision point 546 as to whether the recipient is authorized to request that the secure messaging environment utilize a secured digital certificate protected within the secure messaging environment to decrypt or validate the digital signature applied to the message. In response to determining that the identified recipient is not authorized to request that the secure messaging environment utilize a secured digital certificate protected within the secure messaging environment to decrypt or validate the digital signature applied to the message, the process 500 returns to decision point 502 within FIG. 5A and iterates as described above. As such, unauthorized users may be prevented from receiving messages from the secure messaging environment without an explicit verification of authorization to receive messages using protected digital certificates. It should be noted that an error or log of the unauthorized access attempt is considered to be part of the process 500, though it is not explicitly shown to reduce crowding within the drawing figure.

In response to determining at decision point 546 that the identified recipient is authorized to request that the secure messaging environment utilize a secured digital certificate protected within the secure messaging environment to decrypt or validate the digital signature applied to the message, or in response to determining at decision point 544 not to perform the authorization processing of the recipient of the message (e.g., a default authorization has been configured, etc.), the process 500 makes a determination at decision point 548 as to whether multiple (e.g., a group of) secured digital certificates are configured to optionally decrypt and verify digital signatures applied to messages on behalf of the requesting recipient user within the secure messaging environment. It is understood that the secured digital certificates described herein are digital certificates assigned to and managed within the secure messaging environment, and are digital certificates other than a user-assigned digital certificate of the requesting recipient user (e.g., other than message sender and/or message receiver certificates).

As described above, the determination as to whether multiple secured digital certificates are configured to optionally decrypt and verify digital signatures applied to messages on behalf of the requesting recipient user within the secure messaging environment may be made utilizing the identified message protection policy. For example, the secure messaging component may have a digital certificate assigned to it. The secure messaging component may also manage other digital certificates within the secure messaging environment. As such, multiple digital certificates may be configured for use by the secure messaging component for verifying digital signatures and optionally decrypting messages within the secure messaging environment.

In response to determining at decision point 548 that multiple secured digital certificates are not configured to optionally decrypt and verify digital signatures applied to messages on behalf of the requesting recipient user within the secure messaging environment, and that a single digital certificate is indicated to be used within the message protection policy for optionally decrypting and verifying a digital signature of the message, the process 500 retrieves the policy-specified secured digital certificate of the secure messaging component at block 550. Alternatively, in response to determining at decision point 548 that multiple secured digital certificates are configured to optionally decrypt and verify digital signatures applied to messages on behalf of the requesting recipient user within the secure messaging environment, the process 500 selects one of the multiple policy-specified secured digital certificates of one of the secure messaging components (e.g., an assigned or managed digital certificate) at block 552.

In response to either retrieving the policy-specified secured digital certificate of the secure messaging component at block 550, or in response to selecting one of the multiple policy-specified secured digital certificates of one of the secure messaging components at block 552, the process 500 decrypts, at block 554, the payload of the digitally-signed message (again, may be optional for a given implementation or message) with the private key of the retrieved policy-specified secured digital certificate of the secure messaging component or the selected one of the multiple policy-specified secured digital certificates of one of the secure messaging components. It should additionally be noted that, as also described above, the processing at block 554 may include determining whether the message protection policy specifies a single recipient or a group of recipients. As such, the processing at block 554 may include decrypting the message for a single recipient using the private key of the secured digital certificate in response to determining that the message protection policy specifies the single recipient. Alternatively, the processing at block 554 may include decrypting the message for the group of recipients using the private key of the secured digital certificate in response to determining that the message protection policy specifies the group of recipients.

At block 556, the process 500 verifies the digital signature of the message within the secure messaging environment with the public key of the sender's secured digital certificate. It should be noted that, as described above, the message protection policy may further specify that the secured digital certificate is configured to validate digital signatures of messages on behalf of a group of users. As such, groups of users may be authorized to request that the secure messaging component decrypt and validate/verify digital signatures of messages using secured digital certificates within the secure messaging environment. Accordingly, the processing at block 556 may be utilized to verify digital signatures of messages that originate from any members of the associated group of users using the public key of the secured digital certificate.

As also described above, as an additional alternative, because the encryption and decryption are performed within the secure messaging environment, a single decryption may be performed for multiple users of the group in response to "get" requests if the requesting user is a member of the group and authorized within the secure messaging environment to issue such requests. As such, digital certificate count may be reduced for groups by multiplexing certificate use across groups of authorized users.

In response to verifying the signature of the message as described above at block 556, the process 500 returns to block 542 and forwards the message to the recipient. The process 500 returns to decision point 502 within FIG. 5A and iterates as described above.

As such, the process 500 protects, within the secure messaging environment, the secured digital certificate against access by users. Further, the users do not have to have their own digital certificates or encryption/decryption key pairs to obtain the benefits of secure message communications provided by the process 500. Digital certificate count within a system, such as the system 100, may be reduced. Additionally, by use of secured digital certificates that are not accessible to users, and by allowing users to share secured digital certificates within the secure messaging environment, digital signature processing and encryption overhead may be reduced.

As described above in association with FIG. 1 through FIG. 5B, the example systems and processes provide generalized certificate use in policy-based secure messaging environments. Many other variations and additional activities associated with generalized certificate use in policy-based secure messaging environments are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    determining, within a secure messaging environment, that a request to send a message has been generated by a message sender;
    identifying a message protection policy configured to process the message within the secure messaging environment, where the message protection policy specifies that, within the secure messaging environment, a secured digital certificate, other than a digital certificate of the message sender, is configured with an associated private key to digitally sign the message on behalf of the message sender;
    determining, based upon the message protection policy, to digitally sign the message using the private key of the secured digital certificate;
    signing the message on behalf of the message sender using the private key of the secured digital certificate;
    determining whether the message protection policy specifies a single recipient or a plurality of recipients;
    encrypting the message for the single recipient using a public key of the secured digital certificate in response to determining that the message protection policy specifies the single recipient; and
    encrypting the message for the plurality of recipients using the public key of the secured digital certificate in response to determining that the message protection policy specifies the plurality of recipients.

2. The method of claim 1, further comprising protecting, by the secure messaging environment, the secured digital certificate against access by the message sender.

3. The method of claim 1, where the secured digital certificate comprises at least one of:
   a digital certificate assigned to a secure messaging component within the secure messaging environment; and
   a digital certificate managed by the secure messaging component within the secure messaging environment.

4. The method of claim 3, where the secure messaging component comprises one of a queue manager within the secure messaging environment and a data protection module within the secure messaging environment that interfaces with the queue manager.

5. The method of claim 1, where the message protection policy further specifies that a plurality of secured digital certificates, other than the digital certificate of the message sender, are configured to digitally sign the message on behalf of the message sender, and further comprising:
   selecting one of the plurality of secured digital certificates, other than the digital certificate of the message sender, specified within the message protection policy; and
   where signing the message on behalf of the message sender using the private key of the secured digital certificate comprises:
      signing the message using a private key of the selected one of the plurality of digital certificates.

6. The method of claim 1, where the message protection policy further specifies that the secured digital certificate is configured to digitally sign messages on behalf of a plurality of message senders, and further comprising:
   signing messages of the plurality of message senders using the private key of the secured digital certificate.

* * * * *